United States Patent [19]
Sedovic et al.

[11] Patent Number: 6,048,084
[45] Date of Patent: Apr. 11, 2000

[54] ILLUMINATION REFLECTOR FOR AREA PROJECTION

[75] Inventors: John August Sedovic, Wichita, Kans.; David Jenkins, Tuscon, Ariz.

[73] Assignee: The Coleman Company, Inc., Wichita, Kans.

[21] Appl. No.: 08/831,757

[22] Filed: Apr. 1, 1997

[51] Int. Cl.[7] .................................................... F21V 7/00
[52] U.S. Cl. ..................... 362/347; 362/297; 362/298; 362/346
[58] Field of Search ................................... 362/297, 298, 362/343, 346, 347, 350

[56] References Cited

U.S. PATENT DOCUMENTS

| | | | |
|---|---|---|---|
| D. 89,969 | 5/1933 | Mitchell | D26/44 |
| D. 339,647 | 9/1993 | Kawashima et al. | D26/24 |
| 2,492,946 | 1/1950 | Barber . | |
| 4,229,782 | 10/1980 | Ruud et al. | 362/297 |
| 4,261,030 | 4/1981 | Hernandez | 362/296 |
| 4,386,824 | 6/1983 | Draper | 350/296 |
| 4,570,205 | 2/1986 | Shiojiri | 362/346 X |
| 4,833,578 | 5/1989 | Schaller et al. | 362/296 |
| 4,953,063 | 8/1990 | Nino | 362/61 |
| 4,964,025 | 10/1990 | Smith | 362/346 |
| 4,992,911 | 2/1991 | Ressia | 362/61 |
| 5,271,077 | 12/1993 | Brockman et al. | 385/31 |
| 5,289,356 | 2/1994 | Winston | 362/347 X |
| 5,335,152 | 8/1994 | Winston | 362/347 X |
| 5,424,927 | 6/1995 | Schaller et al. | 362/157 |
| 5,816,693 | 10/1998 | Winston et al. | 362/347 |

*Primary Examiner*—Laura K. Tso
*Attorney, Agent, or Firm*—Kramer Levin Naftalis & Frankel LLP

[57] ABSTRACT

A reflector of a lighting apparatus such as a flashlight has a cupped body with a first pair of opposing walls and a second pair of opposing walls extending from an aperture at the cupped body center to a rectangular opening. The internal surfaces of the walls are reflective. Each of the first pair of walls is concavely curved with a focus point in front of a filament light source inside the cupped body and each of the second pair of walls is convexly curved with a focus point exterior to the cupped body. The first pair of opposing walls and the second pair of opposing walls are shaped to reflect light from the filament light source through the rectangular opening to form a predetermined flood beam by breaking up the filament image and reflecting the resulting light.

22 Claims, 3 Drawing Sheets

ILLUMINATION REFLECTOR FOR AREA PROJECTION

FIELD OF THE INVENTION

The present invention relates to an illumination reflector and more particularly to a reflector that projects a flood light pattern from a filament source.

BACKGROUND OF THE INVENTION

While a portable lighting apparatus such as a flashlight having a small filament light source is generally constructed with a reflector shaped to produce a narrowly focused spot beam for illumination of a distant object, it is often desired to produce a broader flood beam to illuminate a close-by extended area using the filament light source. U.S. Pat. No. 5,424,927 issued to David R. Schaller et al. Jun. 13, 1996 discloses a flashlight having a parabolic reflector that terminates in a rectangular opening. The parabolic reflector collimates light emitted from a filament positioned at the reflector focal point. A rectangular electro-optic device driven by electronic circuitry covers the rectangular opening and operates in a first state to pass the collimated light to form a spot beam. In order to produce a flood beam, the state of the electro-optic device is switched to refract the collimated beam produced by the parabolic reflector. The use of both an electro-optic device and the required electronic drive circuitry, however, is costly and the electro-optic device reduces the amount of light directed from the reflector.

Reflectors for rectangular openings are known which have a pair of opposing parabolic or elliptic reflecting portions that are joined by planar reflective portions. The reflections from the planar reflective portions, however, often result in a non-uniform flood beam. U.S. Pat. No. 4,386,824 issued to Geoffrey R. Draper Jun. 7, 1983 discloses a motor vehicle rectangular lamp reflector which has parabolic lateral reflective portions and upper and lower reflective portions shaped to provide an infinite number of parabolic or elliptical curves. The parabolic or elliptical curves extend forwardly of the reflector body and terminate at the rectangular front opening thereof. The upper and lower reflective portions have foci (focal points) and focal axes that are coincident and increase progressively in focal length from the center of the reflector to the lateral reflective portions. As a result, a relatively complex arrangement of curves on upper and lower reflective portions is required in order to produce a flood beam. Further, the use of concave parabolic lateral reflectors results in non-uniformities in the produced flood beam.

BRIEF SUMMARY OF THE INVENTION

The invention is directed to a light reflector having a cupped body with a rectangular opening at a predetermined distance from a center of the cupped body. A first pair of opposing walls and a second pair of opposing walls extend outward from the cupped body center to the rectangular opening. Each wall has a reflective internal surface which is curved to direct light from a filament source near the body center.

According to one aspect of the invention, each reflective surface of the first pair of opposing walls is curved concave to the cupped body interior and each reflective surface of the second pair of opposing walls is curved convex to the cupped body interior to form a predetermined flood beam light originating at the filament source positioned near the cupped body center and emerging from the rectangular opening, including light reflected from the reflective surfaces of the first and second pairs of opposing walls.

According to another aspect of the invention, each reflective surface of the first pair of opposing walls has a focus point in the interior of the cupped body and the filament source is positioned at the focus point.

According to yet another aspect of the invention, each reflective surface of the second pair of opposing walls has a focus point exterior to the cupped body.

According to yet another aspect of the invention, each reflective surface has a fine matte finish to increase the uniformity of the light pattern from the rectangular opening.

According to yet another aspect of the invention, the cupped body is formed by molding a plastic material such as acrylonitrile-butadiene-stryene (ABS), polycarbonate or styrene-acrylonitrile (SANS), and the reflective surfaces are formed by vacuum depositing aluminum on the plastic material.

In an embodiment of the invention, a reflector for a flashlight has a rectangular front opening and an internal reflective surface with upper and lower reflective surface sections and lateral reflective surface sections extending from a rear opening into which a lamp is inserted. Each of the upper and lower reflective surfaces has its focus point positioned in front of the lamp filament in the cupped body interior and each of the lateral reflective surfaces has its focus point exterior to the cupped body. The upper, lower and lateral sections are shaped to convert light radiated from the lamp filament into a limited size flood beam by breaking up the filament image and reflecting the resulting light.

DETAILED DESCRIPTION OF THE INVENTION

Figure 1:
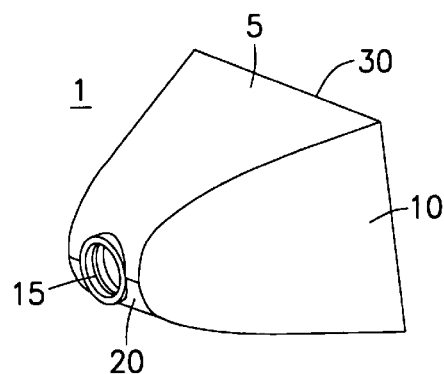
FIG. 1 is a perspective view of a reflector illustrative of the invention.
Figure 2:
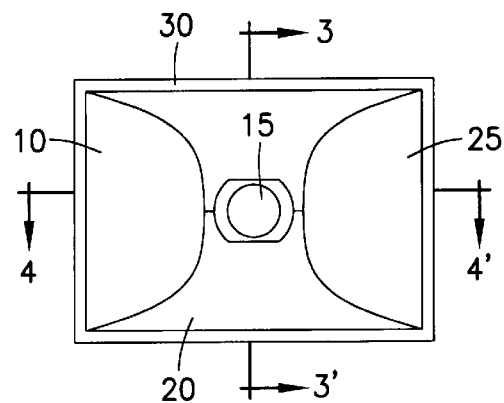
FIG. 2 is a front plan view of the reflector shown in FIG. 1.

FIGS. 1 and 2 depict a perspective view and a front plan view, respectively, of a reflector illustrative of the invention and generally denoted as 1. As shown in FIG. 1, the reflector 1 has a generally cupped shaped body with a center aperture 15 into which a lamp (not shown) is inserted and a rectangular opening 30 through which light passes to project a flood beam. The cupped body has upper and lower walls 5 and 20 and lateral walls 10 and 25 between the aperture 15 and the rectangular opening 30. The upper wall 5 is shaped as a curve downwardly concave with respect to the cupped shaped body interior that extends between the aperture 15 and the rectangular opening 30. The lower wall 20 is shaped as a curve downwardly concave with respect to the cupped shaped body interior that extends between the aperture 15 and the rectangular opening 30. Left lateral wall 10 is shaped as a curve outwardly convex to the interior of the cupped shaped body between the aperture 15 and the rectangular opening 30 and right lateral wall 25 is shaped as a curve outwardly convex to the interior of the cupped shaped body between the aperture 15 and the rectangular opening 30.

Figure 3:
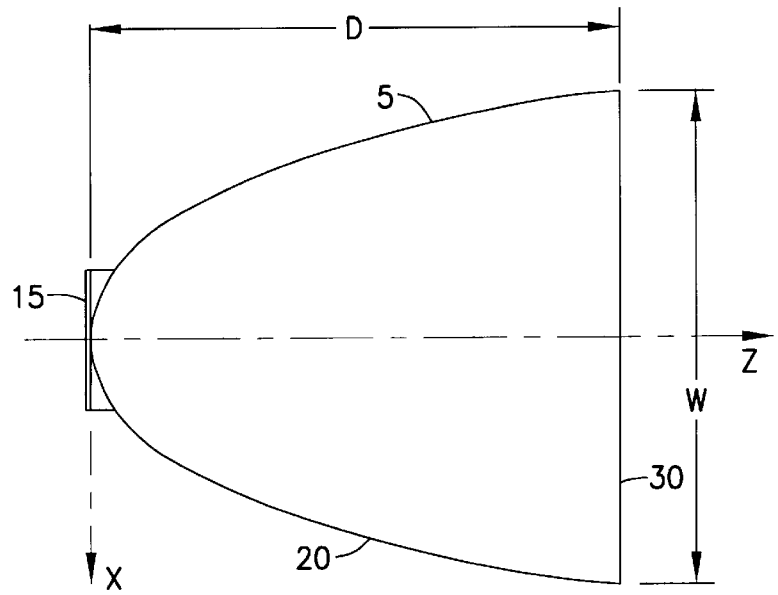
FIG. 3 is a cross-sectional view taken along line 3-3' of FIG. 2.

FIG. 3 shows a cross-sectional view taken along line 3-3' of FIG. 2 that illustrates the shape of the upper and lower walls 5 and 20. Referring to FIG. 3, the upper wall 5 and the lower wall 20 are symmetrical with respect to the central axis of the cupped shaped body. The interior reflective surfaces of the upper and lower walls form curves concave with respect to the central axis of the cupped body. These interior reflective surfaces are shaped to direct light impinging thereon from a focus point in front of the light source toward the rectangular opening 30 so that a substantially uniform beam pattern of predetermined vertical extent is formed.

The reflecting surfaces of upper wall 5 and lower wall 20 are curved to redirect light rays impinging thereon from the light source so that the light rays emerging from the rectangular opening form a uniform beam over a predetermined vertical range. The curve of upper wall 5 generally has a form that satisfies the following relationship:

$$z = \left[\frac{2x}{W}\right]^{n_{1W}} D\eta_W + \left[\frac{2x}{W}\right]^{n_{2W}} D(1 - \eta_W) \qquad (1)$$

where $0 \le \eta_W \le 1,$ $n_{1W}, n_{2W} \ge 1,$

D is the depth of the reflector and W is the width of the rectangular opening 30 shown in FIG. 3.

The curve formed by the reflecting surface of the lower wall 20 is symmetrical to that of the wall 5. The precise shape of the curves for the upper wall 5 and the lower wall 20 of the reflector may be determined by computer modeling techniques well known in the art.

Figure 4:
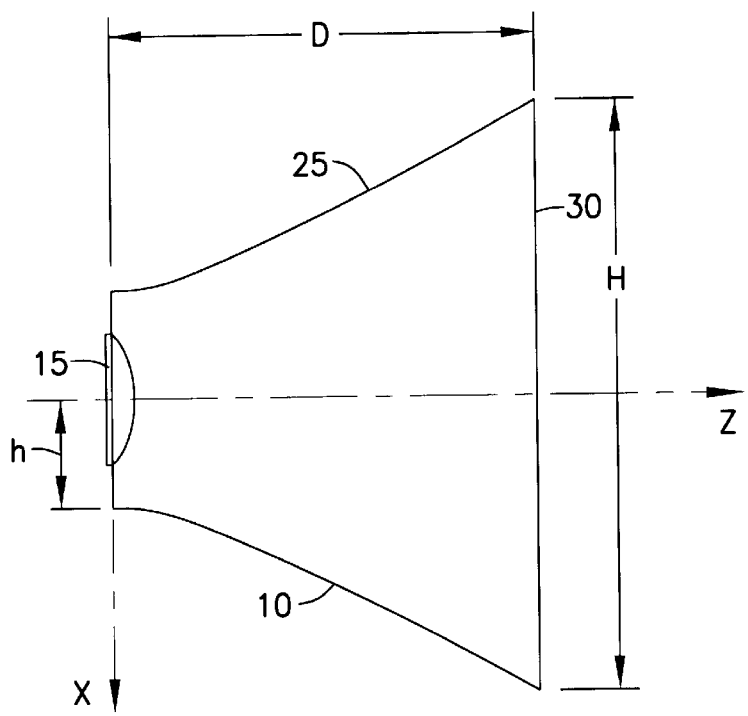
FIG. 4 is a cross-sectional view taken along line 4-4' of FIG. 2.

FIG. 4 shows a cross-sectional view taken along line 4-4' of FIG. 2 that illustrates the shape of the lateral walls 10 and 25. Referring to FIG. 4, the left lateral wall 10 and the right lateral wall 25 are symmetrical with respect to a central axis of the cup-shaped body. The interior reflective surfaces of the lateral walls form outwardly convex curves arranged to direct light impinging thereon toward the rectangular opening 30 so that a beam pattern of predetermined horizontal extent is formed. The reflecting surfaces of lateral walls 10 and 25 are curved to direct light rays impinging thereon from the light source so that the light rays emerging from the rectangular opening form a uniform beam over a predetermined horizontal range. The curve of lateral wall 10 generally has a form that satisfies the following relationship:

$$z = \left[\frac{(y-h)}{\left(y - \frac{H}{2}\right)}\right]^{n_{1H}} D\eta_H + \left[\frac{(y-h)}{\left(y - \frac{H}{2}\right)}\right]^{n_{2H}} D(1 - \eta_H), \qquad (2)$$

$0 \le \eta_H \le 1,$ $0 \le h \le \frac{H}{2},$ $n_{1H}, n_{2H} \le 1,$ and D is the depth of the reflector and H is the height of the rectangular opening as shown in FIG. 4.

The focus points of this curve are exterior to the cupped body and behind the cupped body. The curve formed by the reflecting surface of the lateral wall 25 is symmetrical to that of the wall 10. The precise shape of the curve for the lateral walls 10 and 25 of the reflector may be determined by computer modeling.

The combination of the concave curved upper and lower walls 5 and 20 and the outwardly convex lateral walls 10 and 25 limit the extent of the beam in both the vertical and horizontal directions to provide a uniform flood beam.

For a flashlight reflector that has a rectangular opening of 2.5"×3.5" and is 2.5" deep to produce a 3'×4' rectangular light pattern at a distance of 3 feet from the rectangular opening, a curve defined by the following equation (3) may be used for the upper wall 5.

$$z_1 = 2.5(2x/2.5)^{3.5} \qquad (3)$$

Lower wall 20 follows a curve that is symmetrical with respect to equation (3). A curve defined by the following equation (4) may be used for the shape of the left lateral wall 10.

$$z_2 = 2.5(0.3((y-0.6125)/1.1375) + 0.7((y-0.6125)/1.1375)^{0.75}) \qquad (4)$$

Left lateral wall 25 is shaped according to a curve that is symmetrical to that of equation 4.

For a flashlight reflector that for that has a rectangular opening of 2.0"×2.75" and is 2.25" deep to produce a 2.5'×3.5' rectangular light pattern at a distance of 3 feet from the rectangular opening, a curve defined by the following equation (5) may be used for the upper wall 5.

$$z_1 = 2.25(0.9x^3 + 0.1x^{1.25}) \qquad (5)$$

Lower wall 20 follows a curve that is symmetrical with respect to equation 1. A curve defined by the following equation 6 may be used for the shape of the left lateral wall 10.

$$z_2 = 2.25(y/0.92125)^{0.78} \qquad (6)$$

The other lateral wall 25 is shaped according to a curve that is symmetrical to that of equation 6.

Figure 5:
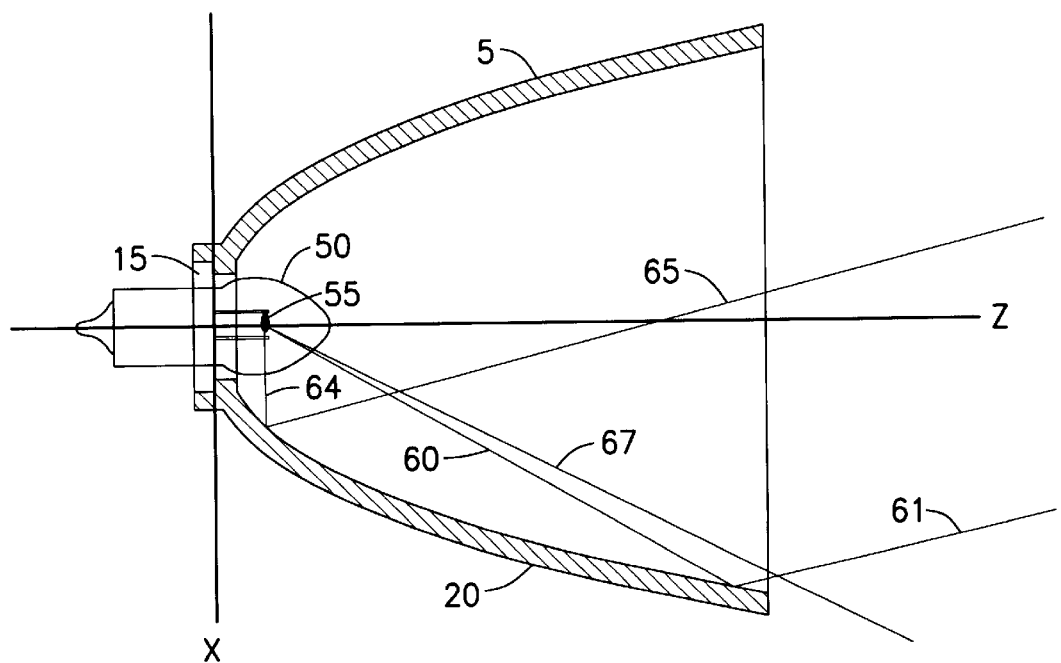
FIG. 5 illustrates a lamp positioned in the reflector depicted in the cross-sectional view of FIG. 3 and sample light ray paths.

FIG. 5 shows a cross-sectional view corresponding to line 3-3' in FIG. 2 with a filament 55 in a lamp 50 that is inserted in the aperture 15 to illustrate light rays being reflected by the reflecting layers of the lower wall 20. A light ray 60 from the filament 55 is reflected from the lower wall 20 in close proximity to the rectangular opening 30 and emerges from the rectangular opening 30 as light ray 61. In similar manner, a light ray 64 impinges on the lower wall reflector 20 to reflect as a light ray 65, and light ray 67 is not reflected by lower wall 20. As can be readily seen, the light rays reflected from upper wall 5 are symmetrical to those reflected from lower wall 20. The light rays from upper wall 5 and lower wall 20 all emerge from the rectangular opening 30 having different directions within a predetermined vertical range in accordance with the restrictions imposed by equation 1.

Figure 6:
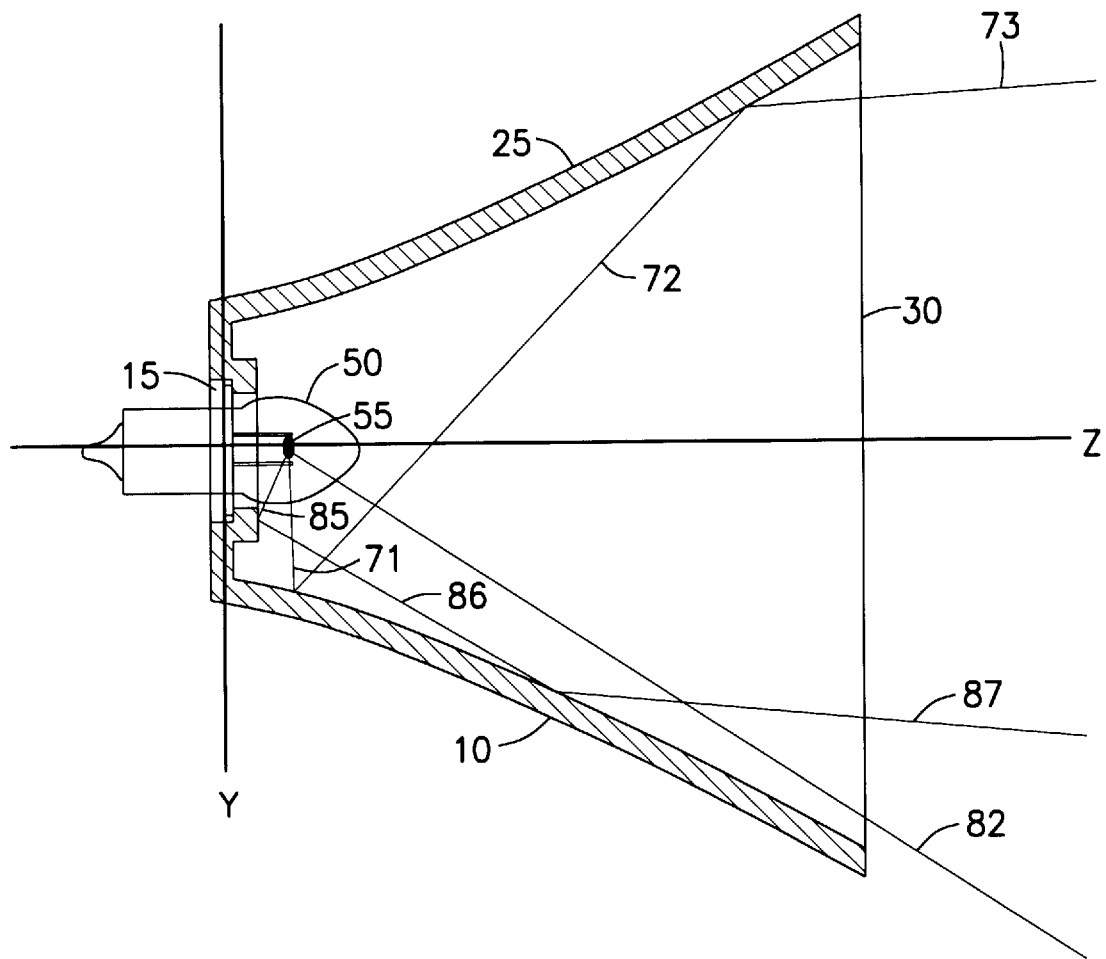
FIG. 6 illustrates a lamp positioned in the reflector depicted in the cross-sectional view of FIG. 4 and sample light ray paths emanating from the lamp.

FIG. 6 shows a cross-sectional view corresponding to line 4-4' in FIG. 2 with the lamp 50 inserted in the aperture 15 to illustrate light rays obtained from the reflecting layers of the lateral walls 10 and 25. A light ray 71 from the filament 55 is reflected from the lateral wall 10 in close proximity to the lamp 50 as light ray 72. The light ray 72 is further reflected from lateral wall 25 as light ray 73. Light ray 82 emerges directly from rectangular opening 30. Light ray 85 is reflected from a black reflective wall as light ray 86 and is further reflected by lateral wall 10 to emerge as light ray 87. As can be readily seen, the light rays reflected from lateral wall 10 are symmetrical to those reflecting from lateral wall 25. The light rays reflecting from lateral walls 10 and 25 all emerge from the rectangular opening 30 having different directions within a predetermined horizontal range in accordance with the restrictions imposed by equation 2.

The reflector cupped body may be formed by molding a plastic material such as acrylonitrile-butadiene-stryene (ABS), polycarbonate, or styrene-acrylonitrile (SANS). Polycarbonate is preferred because of its strength and resistance to heat. The reflective surfaces may be formed by vacuum depositing aluminum on the interior of the walls 5, 10, 20 and 25 obtained by the molding of the plastic material. The reflective surfaces may preferably be matte finished to increase the uniformity of the flood beam pattern.

It is to be understood that the specific embodiments described herein are merely illustrative of the spirit and scope of the invention. Modifications can readily be made by those skilled in the art in accordance with the principles of the invention.

What is claimed is:

1. A light reflector comprising:
    a cupped body having a first pair of opposing walls and a second pair of opposing walls extending from a center aperture of the cupped body to a rectangular opening; and
    a reflective surface formed on an interior of each wall,
    wherein each of the first pair of opposing walls is curved concave to the interior of the cupped body and each of the second pair of opposing walls is curved convex to the interior of the cupped body to form a predetermined flood beam from light emerging from the rectangular opening including light impinging on the reflective surfaces of the first and second pairs of walls from a light source positioned near the cupped body center.

2. A light reflector according to claim 1, wherein each reflective surface of the first pair of opposing walls has a focus point in the interior of the cupped body and each reflective surface of the second pair of opposing walls has a focus point exterior to the cupped body.

3. A light reflector according to claim 1, wherein the reflective surface of one of the first pair of opposing walls is curved according to $$z = \left[\frac{2x}{W}\right]^{n_{1W}} D\eta_W + \left[\frac{2x}{W}\right]^{n_{2W}} D(1 - \eta_W),$$

where $$0 \leq \eta_W \leq 1,$$

and $$n_{1W}, n_{2W} \geq 1,$$

and where D is the distance from the center of the cupped body to the rectangular opening, W is the distance between the first opposing pair of walls at the rectangular opening and x is the distance from the central axis of the cupped body to the surface of the one of the first opposing pair of walls, and the reflective surface of the other of the first pair of opposing walls is curved so that it is symmetrical to the reflective surface of the one of the first pair of opposing walls.

4. A light reflector according to claim 1, wherein the reflective surface of one of the second pair of walls is curved according to $$z = \left[\frac{(y-h)}{\left(y-\frac{H}{2}\right)}\right]^{n_{1H}} D\eta_H + \left[\frac{(y-h)}{\left(y-\frac{H}{2}\right)}\right]^{n_{2H}} D(1 - \eta_H),$$

where $$0 \leq \eta_H \leq 1,$$

and $$0 \leq h \leq H/2,$$

$$n_{1H}, n_{2H} \leq 1,$$

and where D is the distance from the center of the cupped body to the rectangular opening, h is one half the distance across an opening at the center of the cupped body, H is the distance between the second opposing pair of walls at the rectangular opening and y is the distance from the central axis of the cupped body to the surface of the one of the second opposing pair of walls, and the reflective surface of the other of the second pair of walls curved so that it is symmetrical to the reflective surface of the one of the second pair of opposing walls.

5. A light reflector according to claim 1, wherein each reflective surface has a matte finish to increase uniformity of the flood beam.

6. A light reflector according to claim 1, wherein the cupped body is a molded plastic material body.

7. A light reflector according to claim 6, wherein the plastic material is selected from the group consisting of acrylonitrile-butadiene-stryene (ABS), polycarbonate, and styrene-acrylonitrile (SANS).

8. A light reflector according to claim 1, wherein each of the reflecting surfaces comprises vacuum deposited aluminum.

9. A light reflector according to claim 1, wherein each reflective surface of the first pair of opposing walls has a focus point in the interior of the cup shaped body and each reflective surface of the second pair of opposing walls has a focus point exterior to the cup shaped body.

10. A light reflector according to claim 1, wherein the reflective surfaces of the first opposing pair of walls are symmetrical about a central axis of the cup shaped body, the reflective surface of one of the first opposing pair of walls being curved according to $$z = \left[\frac{2x}{W}\right]^{n_{1W}} D\eta_W + \left[\frac{2x}{W}\right]^{n_{2W}} D(1 - \eta_W),$$

where $$0 \leq \eta_W \leq 1,$$

$$n_{1W}, n_{2W} \geq 1,$$

and D is the distance from the center of the cup shaped body to the rectangular opening, W is the distance between the first opposing pair of walls at the rectangular opening and x is the distance from the central axis of the cup shaped body to the surface of the one of the first opposing pair of walls, and the reflective surface of the other of the first opposing pair of walls being curved so that it is symmetrical to the reflective surface of the one of the first opposing pair of walls.

11. A light reflector according to claim 10, wherein the reflective surfaces of the second opposing pair of walls are symmetrical about a central axis of the cup shaped body, the reflective surface of one of the second opposing pair of walls is curved according to $$z = \left[\frac{(y-h)}{\left(y-\frac{H}{2}\right)}\right]^{n_{1H}} D\eta_H + \left[\frac{(y-h)}{\left(y-\frac{H}{2}\right)}\right]^{n_{2H}} D(1-\eta_H),$$

$0 \leq \eta_H \leq 1$, $0 \leq h \leq H/2$, $n_{1H}, n_{2H} \leq 1$, and where D is the distance from the center of the cup shaped body to the rectangular opening, h is one half the distance across an opening at the center of the cup shaped body, H is the distance between the second opposing pair of walls at the rectangular opening and y is the distance from the central axis of the cup shaped body to the surface of the one of the second opposing pair of walls, and the reflective surface of the other of the second opposing pair of walls is curved so that it is symmetrical to the reflective surface of the one of the second opposing pair of walls.

12. A flashlight reflector comprising:

a cupped body including a center positioned aperture for mounting a light source, a rectangular front opening, and an internal reflective surface having opposing upper and lower reflective surface sections and opposing lateral reflective sections each extending from the aperture to the rectangular front opening;

the opposing upper and lower reflective surface sections being concavely curved with respect to the interior of the cupped body and the opposing lateral surfaces being convexly curved with respect to the interior of the cupped body to form a limited size flood beam.

13. A flashlight reflector according to claim 12, wherein each of the upper and lower reflective surface sections has a focus point in the interior of the cupped body and each of the lateral reflective surfaces has a focus point exterior to the cupped body.

14. A light reflector according to claim 12, wherein the upper reflective section is curved according to $$z = \left[\frac{2x}{W}\right]^{n_{1W}} D\eta_W + \left[\frac{2x}{W}\right]^{n_{2W}} D(1-\eta_W),$$

where $0 \leq \eta_W \leq 1$, and $n_{1W}, n_{2W} \geq 1$, and where D is the distance from the center of the cupped body to the rectangular opening, W is the distance between the first opposing pair of walls at the rectangular opening and x is the distance from the central axis of the cupped body to the surface of the one of the first opposing pair of walls, and the lower reflective section is curved so that it is symmetrical to the upper reflective section.

15. A light reflector according to claim 12, wherein one of the lateral reflective sections is curved according to $$z = \left[\frac{(y-h)}{\left(y-\frac{H}{2}\right)}\right]^{n_{1H}} D\eta_H + \left[\frac{(y-h)}{\left(y-\frac{H}{2}\right)}\right]^{n_{2H}} D(1-\eta_H),$$

$0 \leq \eta_H \leq 1$, $0 \leq h \leq H/2$, and $n_{1H}, n_{2H} \leq 1$, and where D is the distance from the center of the cupped body to the rectangular opening, h is one half the distance across an opening at the center of the cupped body, H is the distance between the second opposing pair of walls at the rectangular opening and y is the distance from the central axis of the cupped body to the surface of the one of the second opposing pair of walls, and the other lateral reflective section is curved so that it is symmetrical to the one reflective section.

16. A flashlight reflector according to claim 12, wherein each reflective surface has a matte finish to increase uniformity of the flood beam.

17. A flashlight reflector according to claim 12, wherein the cupped body is a molded plastic material body.

18. A flashlight reflector according to claim 17, wherein the plastic material is selected from the group consisting of acrylonitrile-butadiene-stryene (ABS), polycarbonate, and styrene-acrylonitrile (SANS).

19. A flashlight reflector according to claim 12, wherein each of the reflecting surfaces comprises vacuum deposited aluminum.

20. A flashlight reflector according to claim 12, wherein the rectangular opening is substantially 2.5"×3.5" and the cupped body is substantially 2.5" deep, the upper reflective surface section is shaped substantially according to $$z_1 = 2.5(2x/2.5)^{3.5}$$

the lower reflective surface section is shaped symmetrical to the upper reflective surface section, one of the lateral reflective surface sections is shaped substantially according to $$z_2 = 2.5(0.3((y-0.6125)/1.1375) + 0.7(y-0.6125)/1.1375)^{0.75})$$

where x=0, y=0 and z=0 are positioned at the aperture center, and the other lateral reflective surface section is shaped symmetrical to the one reflective surface section.

21. A flashlight reflector according to claim 12, wherein the rectangular opening is substantially 2.0"×2.275" and the cupped body is substantially 2.25" deep, the upper reflective surface section is shaped substantially according to $$z_1=2.25(0.9x^3+0.1x^{1.25})$$

the lower reflective surface section is shaped symmetrical to the upper reflective surface section, one of the lateral reflective surface sections is shaped substantially according to $$z_2=2.25(y/0.92125)^{0.78}$$

where x=0, y=0 and z=0 are positioned at the aperture center, and the other lateral reflective surface section is shaped symmetrical to the one reflective surface section.

22. A flashlight reflector comprising:

a cupped body having upper and lower opposing walls and opposing lateral walls each extending from a center aperture of the cupped body to a rectangular opening; and a reflective surface formed on the interior of each wall, the parts of the reflective surfaces of the upper and lower walls focusing light toward the rectangular opening having a common focal point interior to the cupped body and the reflective surfaces of the upper and lower walls being shaped to output a substantially uniform light ray pattern over a predetermined vertical range;

the parts of each of the reflective surfaces of the lateral walls having a separate focal point external to the cupped body and the reflective surfaces of the lateral walls being shaped to output a substantially uniform light ray pattern over a predetermined horizontal range.

* * * * *